United States Patent
Müntnich et al.

(10) Patent No.: US 6,330,748 B1
(45) Date of Patent: Dec. 18, 2001

(54) METHOD OF MAKING FORMED BODIES

(75) Inventors: Leo Müntnich; Karl-Ludwig Grell, both of Aurachtal (DE)

(73) Assignee: Ina Wälzlager Schaeffler OHG, Herzogenaurach (DE)

( * ) Notice: Subject to any disclaimer, the term of this patent is extended or adjusted under 35 U.S.C. 154(b) by 486 days.

(21) Appl. No.: 09/184,124

(22) Filed: Nov. 2, 1998

Related U.S. Application Data

(63) Continuation of application No. PCT/EP97/00323, filed on Jan. 24, 1997.

(51) Int. Cl.⁷ ............................................. B21D 53/12
(52) U.S. Cl. ........................................................ 29/898.067
(58) Field of Search ........................ 29/898.067, 898.065; 148/602, 601, 603; 72/135

(56) References Cited

U.S. PATENT DOCUMENTS

| | | | |
|---|---|---|---|
| 2,933,803 | * | 4/1960 | Schaeffler .................... 29/898.067 |
| 3,202,467 | * | 8/1965 | Eckstein ...................... 29/898.067 |
| 3,228,090 | * | 1/1966 | Schaeffler .................... 29/898.067 |
| 3,256,585 | * | 6/1966 | Ripple ......................... 29/898.067 |
| 3,365,775 | * | 1/1968 | Cavagnero et al. ........... 29/898.067 |
| 3,526,026 | * | 9/1970 | Warchol ....................... 29/898.067 |
| 3,699,793 | * | 10/1972 | Wagner ........................ 29/898.067 |
| 3,797,083 | * | 3/1974 | Schaeffler et al. ............ 29/898.067 |
| 3,992,764 | * | 11/1976 | Serasio ........................ 29/898.067 |
| 4,212,095 | * | 7/1980 | Warchol ....................... 29/898.067 |
| 4,320,565 | * | 3/1982 | Warchol ....................... 29/898.067 |
| 4,881,987 | * | 11/1989 | Kambara et al. ............... 148/12 B |
| 4,888,972 | * | 12/1989 | Rouse ............................... 72/186 |
| 5,669,992 | * | 9/1997 | Bronsema et al. ................ 148/602 |

FOREIGN PATENT DOCUMENTS

| | | | |
|---|---|---|---|
| 392166 | * | 9/1965 | (CH) ............................ 29/898.067 |
| 1602557 | * | 1/1970 | (DE) ............................ 29/898.067 |
| 3136013 | * | 4/1983 | (DE) ............................ 29/898.067 |
| 2144808 | * | 3/1985 | (GB) ............................ 29/898.067 |
| 48-7972 | * | 3/1973 | (JP) ............................ 29/898.067 |

* cited by examiner

*Primary Examiner*—I Cuda Rosenbaum
*Assistant Examiner*—T. Nguyen
(74) *Attorney, Agent, or Firm*—Henry M. Feiereisen

(57) ABSTRACT

A method of making a formed body from iron alloys, in particular a cage for use in a radial roller bearing, axial roller bearing or linear roller bearing, includes the steps of treating a metal strip by heat treatment or thermochemical treatment for providing the metal strip with desired properties with respect to hardness, strength and wear resistance, and punching a plurality of spaced slots into the metal strip for formation of pockets for receiving rolling elements.

6 Claims, 1 Drawing Sheet

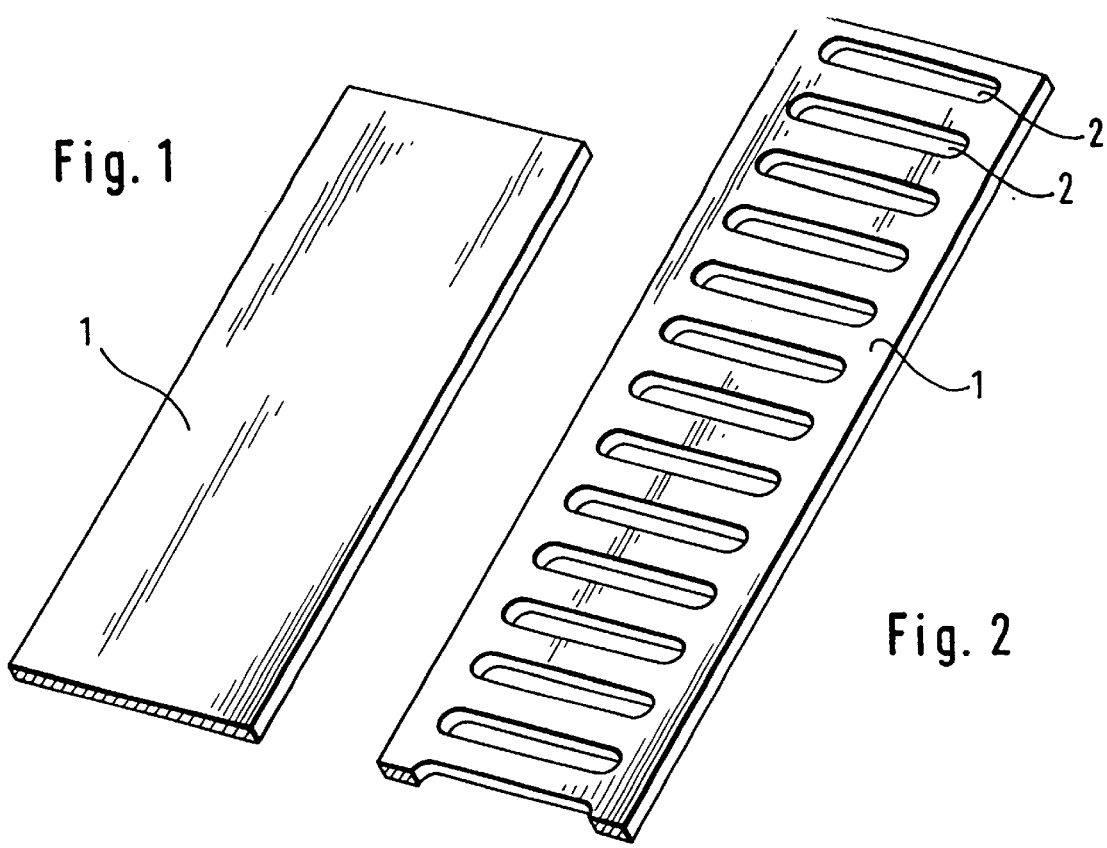
Fig. 1
Fig. 2
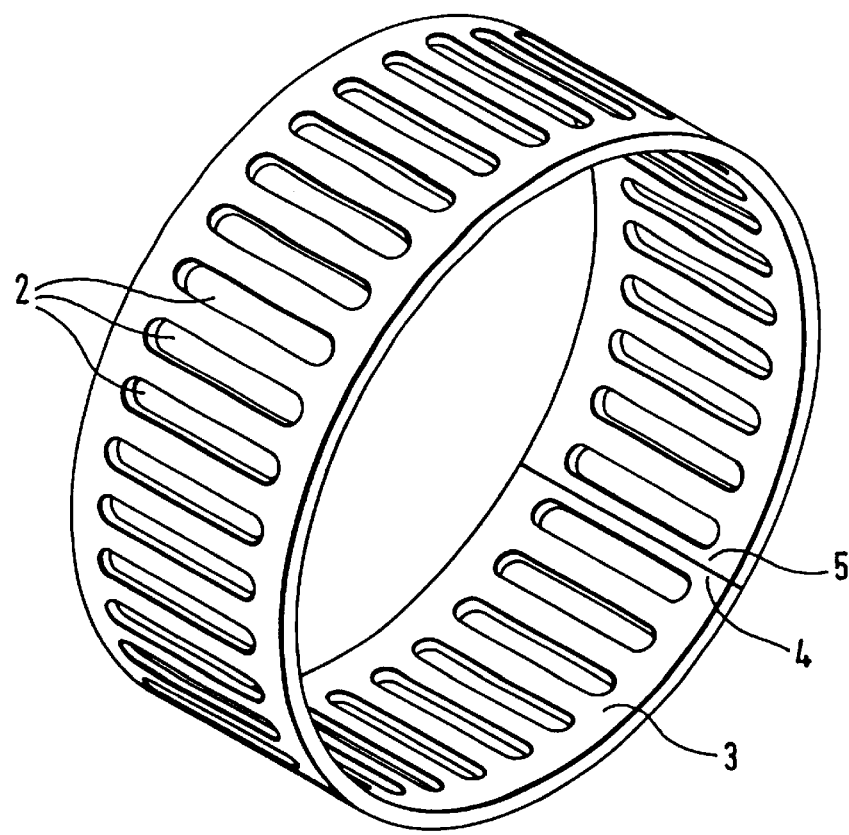
Fig. 3

METHOD OF MAKING FORMED BODIES

CROSS-REFERENCES TO RELATED APPLICATIONS

This application is a continuation of prior filed copending PCT International application no. PCT/EP97/00323, filed Jan. 24, 1997.

BACKGROUND OF THE INVENTION

The present invention relates to a method of making formed bodies from iron alloys, in particular for making cages for radial roller bearings, axial roller bearings or linear roller bearings.

Steel cages for roller bearings are manufactured on an industrial scale in various fashions. Examples include drawing, punching or bending steel sheet or also steel pipe, as described e.g. in German publications DE-OS 21 47 169 or 21 47 171. For realizing cages to withstand particularly high loads, the strength and wear-resistance of cages can be further improved through additional heat treatment or thermochemical treatment, such as casehardening or nitriding, as disclosed e.g. in German publication DE-OS 25 56 745.

It is also known to manufacture cages for radial bearings from a strip material by punching slots into the strip for formation of pockets that receive rolling elements, subsequently bending the strip into a round configuration, and optionally fusing adjacent ends of the strip, as disclosed e.g. in French Pat. No. 1,256,601 or U.S. Pat. No. 2,288,564. This type of manufacturing process based on a bent strip is also applicable for axial bearings, as described e.g. in German Pat. No. DE 21 46 056 C3.

U.S. Pat. No. 3,173,192 describes a process for manufacturing cages for a cylindrical roller bearing by initially forming a strip of non-hardened low carbon steel into a desired profiled configuration and subsequently punching a plurality of spaced slots into the metal strip to form pockets for receiving rolling elements. Thereafter, the thus prepared metal strip is bent into a round configuration to form a cage which then is exposed to a heat treatment for purposes of obtaining improved mechanical properties with respect to hardness, strength and wear resistance. The sequence of this process is selected in this manner because it allows application of only low forces for realizing the shaping and punching steps in view of the untreated metal strip.

The application of heat treatment or thermochemical treatment, in particular in conjunction with delicate cages, i.e. cages of slight wall thickness and web strength, results in a distortion of the shape and size, rendering in extreme cases such formed bodies useless. The distortion of the workpieces are caused during hardening by superimposition of a deformation caused by internal stress during heat treatment and the volumetric change during transformation.

SUMMARY OF THE INVENTION

It is thus an object of the present invention to provide an improved method of making formed bodies, obviating the afore-stated drawbacks.

In particular, it is an object of the present invention to provide an improved method for making formed bodies, which eliminates any distortion thereof and improves their properties despite application of a heat treatment.

These objects, and others which will become apparent hereinafter, are attained in accordance with the present invention by treating a metal strip through heat treatment or thermochemical treatment before punching a plurality of spaced slits into the metal strip for formation of pockets to receive rolling elements.

By subjecting the starting material, i.e. the metal strip, to a heat treatment or thermochemical treatment before carrying out the punching step, changes in shape or size of the material are taken into account before the actual shaping step is carried out. Thus, deformations caused by internal stress and the volumetric change during transformation have already occurred before the formed bodies are shaped into their final configuration.

It is to be understood that the term "heat treatment" as used in the description will denote any treatment involving the heating and cooling of a metal or alloy in the solid state for the purpose of improving certain desirable conditions and properties, without intended changes of the chemical composition, while the term "thermochemcial treatment" refers to any process by which the chemical composition and the structure, preferable in the outer surface of steel parts, are modified through thermal and chemical influence for the purpose of obtaining certain desirable properties of the formed bodies.

According to another feature of the present invention, the metal strip is bent into a round shape after the punching step, and subsequently, adjacent ends of the metal strip are fused together to provide the final configuration. Advantageously, in view of the predetermined hardenability, the weld seam does not experience any martensite formation so that no martensitic flash is encountered which could abrade components of the roller bearing such as tracks or races.

As a result of the momentary heat development during welding at a temperature below the $AC_1$, temperature ("temperature at which austenite begins to be formed upon heating a steel"), the tempered strip texture is not exposed to a significant temper effect so that the transition area of the weld seam does not experience a softening that falls below the basic strength. Inherent stress as a result of welding are mostly compensated by the sufficient material toughness.

According to another feature of the present invention, the metal strip is casehardened or nitro-carburized. Casehardening normally involves annealing a steel with a low carbon content of 0.05 to 0.20% that is practically not hardenable, at an elevated temperature between 850° C. to 1,000° C. with a solid carburizing agent or with a gaseous carburizing agent or liquid carburizing agent. During casehardening, carbon diffuses to the outer layers of the workpiece involved here so as to obtain a composite type workpiece having a soft ductile core with low carbon content and an outer surface with high carbon content.

Nitro-carburizing like casehardening is a thermochemical process which involves introduction of nitrogen and carbon into the outer surface of steel parts for the purpose of obtaining certain desired properties such as hardness, strength and wear resistance.

Preferably, the metal strip is tempered after being rolled into the round configuration and fused at the adjacent ends, suitably at a temperature of about 180° C. at a retention time of about one hour, or at a temperature of about 350° C. at a retention time of about 5 seconds. Through tempering the deformed texture is stabilized to thereby augment the fatigue strength and to reduce inherent stress due to welding while yet eliminating the possibility of any changes in size or shape.

BRIEF DESCRIPTION OF THE DRAWING

The above and other objects, features and advantages of the present invention will now be described in more detail with reference to the accompanying drawing in which:

FIG. 1 is a perspective view of a flat steel strip in its initial stage;

FIG. 2 is a perspective view of the steel strip after slots have been punched out to form pockets; and FIG. 3 is a perspective view of the slotted steel band rolled into a round shape and fused at adjacent ends.

DETAILED DESCRIPTION OF PREFERRED EMBODIMENTS

Throughout all the Figures, same or corresponding elements are always indicated by same reference numerals.

Turning now to the drawing, and in particular to FIG. 1, there is shown a perspective view of a flat and straight steel strip 1 made of C22, i.e. a carbon steel having a carbon content of 0.22%. The steel strip 1 is tempered in a continuous furnace in a manner typically carried out with spring band steels according to German Industrial Standard (DIN) 17 222. Through tempering, a strength should be realized between 250 to 350 HV or 850 to 1,100 N/mm$^2$ tensile strength. In the next step, as shown in FIG. 2, slots are punched or stamped out of the thus tempered strip 1 to form pockets 2 for receiving rolling elements (not shown). Subsequently, the slotted strip 1 is rolled into a cylindrical shape and the adjacent ends 4, 5 are fused together through a welding operation to form a radial cage 3, as shown in FIG. 3.

By executing the heating process before the shaping process, the advantage attained through the heat treatment with respect to hardness is not accompanied by the drawback of distortion and changes in shape because the unavoidable alterations in shape and size during heat treatment effect only the flat and unslotted metal strip in its initial stage.

The method according to the present invention is certainly equally applicable for flat and linear bearings which are characterized by a reciprocating linear motion in one plane, e.g. guide systems for machines. In this application, the metal strip remains flat and thus is not rolled into an annular cage, with its adjacent ends being fused. Also the application of the method according to the invention for manufacturing an axial cage is possible in a simple manner.

While the invention has been illustrated and described as embodied in a method of making formed bodies, it is not intended to be limited to the details shown since various modifications and structural changes may be made without departing in any way from the spirit of the present invention.

What is claimed is:

1. A method of making a cage for use in a radial roller bearing, axial roller bearing or linear roller bearing, said method comprising in succession the steps of:

treating a metal strip by a process selected from the group consisting of heat treatment or thermochemical treatment for providing the metal strip with desired properties with respect to hardness, strength and wear resistance;

punching a plurality of spaced slots into the metal strip for formation of pockets for receiving rolling elements; and rolling the metal strip into a round shape and fusing adjacent ends of the metal strip to form a cage.

2. The method of claim 1 wherein the treating step includes casehardening the metal strip.

3. The method of claim 1 wherein the treating step includes nitrocarburizing the metal strip.

4. The method of claim 1, and further comprising the step of tempering the metal strip after being rolled into the round configuration and fused at the adjacent ends.

5. The method of claim 4 wherein the tempering step is executed at a temperature of about 180° C. at a retention time of about one hour.

6. The method of claim 4 wherein the tempering step is executed at a temperature of about 350° C. at a retention time of about 5 seconds.

* * * * *